US008453863B2

(12) United States Patent
Osaku et al.

(10) Patent No.: US 8,453,863 B2
(45) Date of Patent: Jun. 4, 2013

(54) REDUCING AGENT CONTAINER STRUCTURE

(75) Inventors: Yasushi Osaku, Ageo (JP); Kiyoshi Fukuda, Ageo (JP); Toshio Kondou, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 517 days.

(21) Appl. No.: 11/790,740

(22) Filed: Apr. 27, 2007

(65) Prior Publication Data
US 2008/0138258 A1 Jun. 12, 2008

Related U.S. Application Data

(63) Continuation of application No. PCT/JP2005/017293, filed on Sep. 20, 2005.

(30) Foreign Application Priority Data

Oct. 28, 2004 (JP) .................................. 2004-313384

(51) Int. Cl.
*B65D 65/14* (2006.01)
(52) U.S. Cl.
USPC ............................. 220/210; 220/288; 215/207
(58) Field of Classification Search
USPC ............ 220/210, DIG. 20, DIG. 33, DIG. 32, 220/288; 215/207
See application file for complete search history.

(56) References Cited

U.S. PATENT DOCUMENTS

| 1,689,979 | A | * | 10/1928 | Tate et al. ........................ 70/166 |
| 1,702,532 | A | * | 2/1929 | Boomer et al. ............... 220/210 |
| 1,747,200 | A | * | 2/1930 | White ............................... 70/164 |
| 1,839,423 | A |   | 1/1932 | Stone |
| 1,902,456 | A | * | 3/1933 | Matthews ..................... 220/86.2 |
| 1,936,207 | A | * | 11/1933 | Penn ................................. 70/173 |
| 1,989,300 | A | * | 1/1935 | Webb ........................... 220/86.2 |

(Continued)

FOREIGN PATENT DOCUMENTS

| DE | 10024817 A1 | 11/2001 |
| DE | 20312178 U1 | 10/2003 |

(Continued)

OTHER PUBLICATIONS

Notice of Reasons of Rejection of the present invention of Japanese Patent Application No. 2004-303462.

*Primary Examiner* — Anthony Stashick
*Assistant Examiner* — Christopher McKinley
(74) *Attorney, Agent, or Firm* — McDermott Will & Emery LLP

(57) ABSTRACT

A liquid reducing agent container structure adapted for an exhaust emission purifying system that is capable of reductively purifying $NO_x$ in the exhaust gas using a liquid reducing agent, and provided with a configuration such that a lock (42, 60, 70) is detachably disposed on the outer face of an inlet port (34) disposed on a container body (24A) of a reducing agent container (24), and an engagement portion (36a, 50, 54, 56, 58) with which a locking member (42d, 60d, 70b) of the lock (42, 60, 70) can be engaged is disposed on the side of a cap member (36) which is configured to be screwed on the inlet port (34) to seal the inlet port (34), thereby engaging the locking member (42d, 60d, 70b) with the engagement portion (36a, 50, 54, 56, 58) with a locking operation by the lock (42, 60, 70) to block and prevent a rotation of the cap member (36).

3 Claims, 13 Drawing Sheets

U.S. PATENT DOCUMENTS

| | | | | | |
|---|---|---|---|---|---|
| 2,041,387 | A | * | 5/1936 | Adams | 292/144 |
| 2,101,348 | A | * | 12/1937 | Schellinger | 292/141 |
| 2,294,922 | A | * | 9/1942 | Malluk | 220/287 |
| 3,035,732 | A | * | 5/1962 | Baker | 220/3.8 |
| 3,394,836 | A | * | 7/1968 | Millard | 220/210 |
| 3,477,607 | A | * | 11/1969 | Johnson, Jr et al. | 220/210 |
| 3,630,407 | A | * | 12/1971 | Mross | 220/210 |
| 3,930,388 | A | * | 1/1976 | Barras | 70/159 |
| 4,186,843 | A | * | 2/1980 | Omori | 220/210 |
| 4,254,888 | A | * | 3/1981 | Chandler | 220/694 |
| 4,370,919 | A | * | 2/1983 | Wagner et al. | 454/367 |
| 4,474,041 | A | * | 10/1984 | Finck, Jr. | 70/159 |
| 4,887,669 | A | * | 12/1989 | Paulus | 166/85.1 |
| 4,984,698 | A | * | 1/1991 | Stuckey | 215/207 |
| 4,986,097 | A | | 1/1991 | Derman | |
| 4,988,097 | A | | 1/1991 | Smith et al. | |
| 5,464,109 | A | * | 11/1995 | Greenwald | 215/207 |
| 5,687,594 | A | * | 11/1997 | Wang | 70/495 |
| 6,063,350 | A | | 5/2000 | Tarabulski et al. | |
| 6,679,051 | B1 | | 1/2004 | Upadhyay et al. | |
| 2002/0083699 | A1 | | 7/2002 | Bender et al. | |
| 2004/0177606 | A1 | | 9/2004 | Scharsack | |

FOREIGN PATENT DOCUMENTS

| | | |
|---|---|---|
| FR | 557305 | 8/1923 |
| FR | 2564147 | 11/1985 |
| GB | 523587 | 7/1940 |
| GB | 974243 | 11/1964 |
| GB | 1595030 | 8/1981 |
| JP | 47-10575 | 4/1972 |
| JP | 48-77510 | 9/1973 |
| JP | S59-517 | 1/1984 |
| JP | 3-34934 | 4/1991 |
| JP | 06-173656 | 6/1994 |
| JP | 301191 | 3/1995 |
| JP | 7-47218 | 11/1995 |
| JP | 11-028941 | 2/1999 |
| JP | 2000-027627 | 1/2000 |
| JP | 2001-120920 | 5/2001 |
| JP | 2002-527660 | 8/2002 |
| JP | 2003-042031 | 2/2003 |
| JP | 2003-083187 | 3/2003 |
| JP | 2003-314252 | 11/2003 |
| JP | 2004-529286 | 9/2004 |
| WO | WO 00/21881 | 4/2000 |

* cited by examiner

REDUCING AGENT CONTAINER STRUCTURE

This application is a continuation of PCT/JP2005/017293, filed on Sep. 20, 2005.

BACKGROUND OF THE INVENTION

1. Field of the Invention

The present invention relates generally to an improvement in an exhaust emission purifying apparatus, and in particular, relates to a reducing agent container having an improved structure thereof, which is to be used in an exhaust emission purifying system for reductively purifying nitrogen oxides ($NO_x$) in the exhaust gas using a liquid reducing agent. More particularly, the present invention relates to an improved technique for forming a cap member which seals a reducing agent inlet port of the reducing agent container, to have a lockable structure, to thereby prevent undesirable access to the reducing agent container.

2. Description of the Related Art

A conventional exhaust emission purifying apparatus, as a proposal for an exhaust emission purifying system for eliminating $NO_x$ contained in the exhaust gas of an engine, in which a liquid reducing agent of necessary amount according to engine operating conditions is injection-supplied to the exhaust upstream of a reduction catalytic converter disposed in an engine exhaust emission system, so that $NO_x$ in the exhaust gas and the liquid reducing agent are subjected to the catalytic-reduction reaction, to thereby purify $NO_x$ into harmless components, has been provided (refer to Japanese Unexamined Patent Publication No. 2000-27627, for example). Here, for the reduction reaction, ammonia which has a good reactivity to $NO_x$ is used, and as the liquid reducing agent, the urea aqueous solution which is hydrolyzed with the exhaust heat and the water vapor in the exhaust gas to generate ammonia, is used.

However, when foreign substances other than the liquid reducing agent, such as the dust, cigarette butt or dottle and the like, are intentionally dropped into a reducing agent container for the purpose of bothering, such foreign substances pass from the reducing agent container through reducing agent supply piping to enter the inside of a reducing agent supplying device, thereby causing the failure. In order to prevent undesirable access to the reducing agent container, such as mischief, it is absolutely desirable to lock a cap for a reducing agent inlet port by means of a lock, so as to make the cap impossible to be freely removed. However, in the case where a known structure in which a lock is incorporated into a cap center portion, as conventionally shown in a filler cap and the like for a fuel tank, is applied to the cap for the reducing agent container, there is a possibility that the liquid reducing agent in the container intrudes the inside of the lock, and solute (urea) of the liquid reducing agent is crystallized to be accumulated in the lock so that locking and unlocking operations cannot be performed.

SUMMARY OF THE INVENTION

Therefore, in view of the above conventional problems, the present invention has an object to provide a reducing agent container having an improved structure, which can make a cap difficult to be freely removed so as to prevent any unpleasant mischief, by locking the cap by means of a lock arranged on the outside of a container, and also can prevent the lock from being inoperable due to solute deposition of the liquid reducing agent.

In order to achieve the above object, a reducing agent container having an improved a structure thereof, according to the present invention is provided with such a configuration that a lock having a locking member is mounted on the outer face of an inlet port through which a liquid reducing agent is poured into a container body, an engagement portion with which the locking member of the lock can be positively engaged is formed on a cap member which is configured to be screwed on the inlet port to seal the inlet port, and the locking member is engaged with the engagement portion, through locking operation of the lock, so that a rotation of the cap member can be prevented.

Further, according to the present invention, the lock may be mounted on one of positions except for a given position that is located directly below the inlet port, which is defined by a portion raised from a side face of the container body.

Furthermore, according to the present invention, the lock may be mounted on the outer face of the inlet port and on the right hand of the cap member which is configured to seal the inlet port.

Still further, according to the present invention, the engagement portion may be formed on the cap member on each of positions symmetric to the center of the cap member.

According to the present invention, as the engagement portion, a recess portion is formed on a backside of an outer peripheral portion of the cap member, so that the locking member moves in or out of the recess portion in response to a motion of the locking member traveling in an axial direction of the cap member.

Further, according to the present invention, as the engagement portion, an engagement hole may be bored on the outer peripheral portion of the cap member, so that the locking member moves in or out of the engagement hole in response to a motion of the locking member traveling in a diametrical direction of the cap.

Furthermore, according to the present invention, as the engagement portion, the engagement hole may be disposed on the outer peripheral portion of the cap member, so that the locking member moves in or out of the engagement hole in response to a motion of the locking member traveling in the axial direction of the cap member.

Still further, according to the present invention, as the engagement portion, a hook portion may be formed on the outer peripheral portion of the cap member, so that, by a rotational motion of the locking member, the locking member moves in or out of the hook portion.

Even still further, according to the present invention, as the engagement portion, a pair of protruding portions each of which protrudes outwardly from the side face may be formed on a side face of the outer peripheral portion of the cap member, so that the locking member moves in or out of a space between the pair of protruding portions in response to a motion of the locking member traveling in the axial direction of the cap member.

Furthermore, according to the present invention, the lock may be mounted on the outer face of the inlet port and on a position on the right hand of the cap member which is configured to seal the inlet port, and also, on one of positions located on the lower side from the center of the inlet port except for a given position directly below the inlet port, which is defined by a portion raised from the side face of the container body.

According to the present invention as described above, since the cap member can be locked by means of the lock, the cap member cannot be easily removed, and therefore, it is possible to prevent any unpleasant mischief, such as, the intentional dropping of foreign substances into the container.

In addition, since the lock is arranged to be mounted on the outer face of the inlet port, the lock is not in contact with the liquid reducing agent, and therefore, it is possible to prevent the lock from being inoperable due to the solute deposition of the liquid reducing agent in the lock.

Further, when the lock is configured to be mounted on the position except for the position directly below the inlet port which is defined by a portion raised from the side face of the container body, even in the case where the liquid reducing agent is spilled out from the inlet port, it is possible to prevent the liquid reducing agent from being directly spilled on the lock.

Furthermore, when the configuration is such that the lock is mounted on the outer face of the inlet port and on the right hand of the cap member which is configured to seal the inlet port, it becomes possible to easily perform the locking/unlocking operations by an operator by the right hand.

Still further, when the configuration is such that the engagement portion is formed on the cap member on each of the positions symmetric to the center of the cap member, it is possible to increase the degree of freedom of attaching the cap member on the inlet port.

Even still further, if the configuration is such that the recess portion which is configured as the engagement portion with which the locking member is engaged, is formed on the backside of the outer peripheral portion of the cap member, an external appearance of the cap member can be made same as that of a cap member which is not provided with a lock mechanism by a lock.

Hereunder, there will be described embodiments of the present invention based on the accompanying drawings.

DESCRIPTION OF THE PREFERRED EMBODIMENTS

Figure 1:
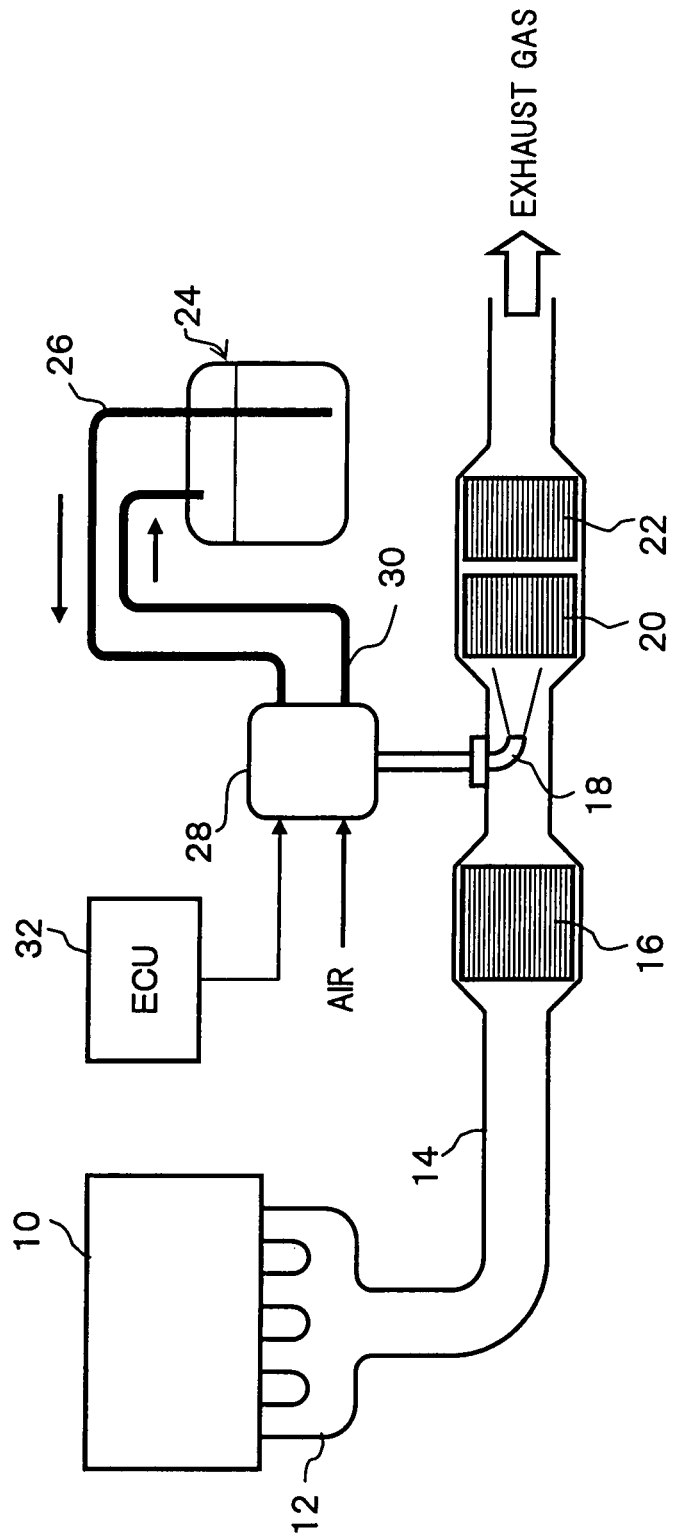
FIG. 1 is an overall configuration diagram of an exhaust emission purifying apparatus to which the present invention is to be applied.

FIG. 1 shows an overall configuration of an exhaust emission purifying apparatus for purifying $NO_x$ contained in the exhaust gas of an engine by the catalytic-reduction reaction, using the urea aqueous solution as a liquid reducing agent, to which a reducing agent container according to the present invention is applied.

In FIG. 1, in an exhaust pipe 14 connected to an exhaust manifold 12 of an engine 10, there are disposed respectively, along an exhaust gas flow direction, an oxidation catalytic converter 16 for oxidizing nitrogen monoxide (NO) into nitrogen dioxide ($NO_2$), an injection nozzle 18 configured to injection-supply the urea aqueous solution, a $NO_x$ reduction catalytic converter 20 for reductively purifying $NO_x$ with ammonia obtained by hydrolyzing the urea aqueous solution, and an ammonia oxidation catalytic converter 22 for oxidizing ammonia passed through the $NO_x$ reduction catalytic converter 20. Further, the urea aqueous solution stored in a reducing agent container 24 is supplied to a reducing agent supplying device 28 via supply piping 26, while the surplus urea aqueous solution which did not contribute to the injection in the reducing agent supplying device 28 being returned into an upper space of the reducing agent container 24 via return piping 30. Then, the reducing agent supplying device 28 is controlled by a control unit 32 incorporating therein a computer, to supply the urea aqueous solution of necessary amount depending on engine operating conditions to the injection nozzle 18 while mixing the urea aqueous solution with air.

In such an exhaust emission purifying apparatus, the urea aqueous solution injection-supplied from the injection nozzle 18 is hydrolyzed by the exhaust heat and the water vapor in the exhaust gas to generate ammonia. It is known that resulted ammonia reacts with $NO_x$ in the exhaust gas in the $NO_x$ reduction catalytic converter 20 to purify the $NO_x$ into water and harmless gas. At this time, in order to improve the $NO_x$ purification efficiency by the $NO_x$ reduction catalytic converter 20, NO is oxidized into $NO_2$ by the oxidation catalytic converter 16, so that a rate between NO in the exhaust gas and $NO_2$ therein is improved to more suitable rate for the catalytic-reduction reaction. Further, ammonia passed through the $NO_x$ reduction catalytic converter 20 is oxidized by the ammonia oxidation catalytic converter 22 disposed on the exhaust downstream of the $NO_x$ reduction catalytic converter 20, and therefore, it is possible to prevent ammonia of bad odor from being discharged into the atmosphere just as it is.

Figure 2:
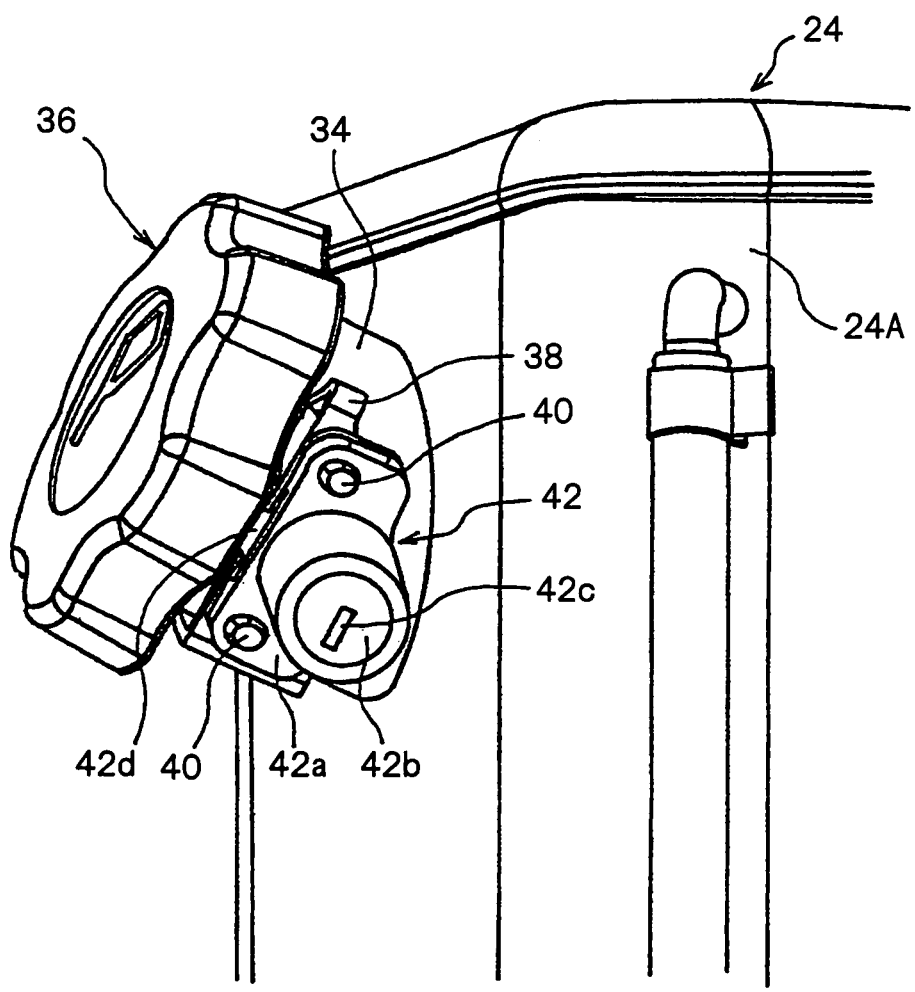
FIG. 2 is an essential part perspective view showing a first embodiment of a reducing agent container according to the present invention.

In the reducing agent container 24 of the above exhaust emission purifying apparatus, on one of upper side face portions forming bifacial widths in a longitudinal direction of a container body 24A which is in approximately rectangular shape, as shown in FIG. 2, there is disposed a raised portion defining an inlet port 34 through which the urea aqueous solution is supplied by pouring and sealed by a cap member 36. On the other upper side face portion (not shown in the figure), a handle configured to be held when carrying the reducing agent container 24 is disposed.

To an outer face of the inlet port 34 of the reducing agent container 24 according to the present first embodiment shown in FIG. 2, a base portion 38 is secured by the welding or the like, and to this base portion 38, a lock 42 is detachably secured by means of screw bolts 40. Here, a mounting position of the lock 42 is desirable to be arranged on a position except for a position directly below the inlet port 34, for example, on a lateral side of the inlet port 34 as shown in the figure or the like. Still further, the mounting position of the lock 42 is desirable to be arranged on the right hand of the cap member 36 and also on the lower side of the center of the inlet port 34 as shown in the figure. With such an arrangement, even in the case where the liquid reducing agent is spilled out through the inlet port 34, it is possible to prevent the liquid reducing agent from being directly spilled on the lock 42, and also to prevent the liquid reducing agent from intruding into the lock 42. Further, by arranging the lock 42 on the position located on the right hand of the cap member 36 attached to the inlet port 34 to eventually seal the inlet port 34, locking/unlocking operations of the lock 42 by an operator by the right hand can be easily performed.

Figure 3:
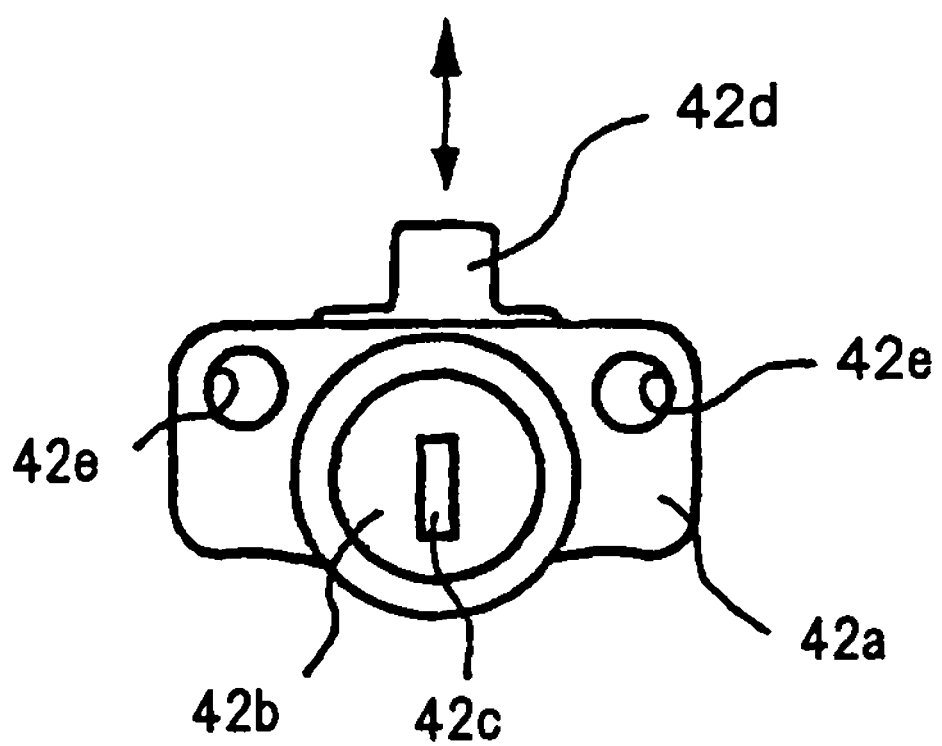
FIG. 3 is a front view of a lock.

The lock 42 has a structure as shown in FIG. 3, in which, when a key is inserted into a key slot 42c of an internal cylinder 42b incorporated in a lock body 42a to thereby turn the internal cylinder 42b, a locking member 42d travels in an arrow direction indicated in the figure to move in or out of the lock body 42a. Incidentally, 42e denotes a bolt insertion hole configured to be inserted therein the bolt 40.

Figure 4:
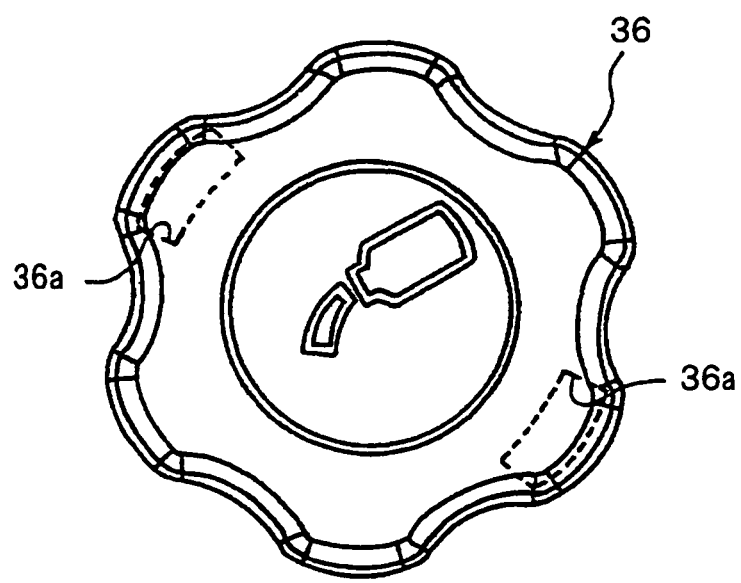
FIG. 4 is a top view of a cap member.
Figure 5:
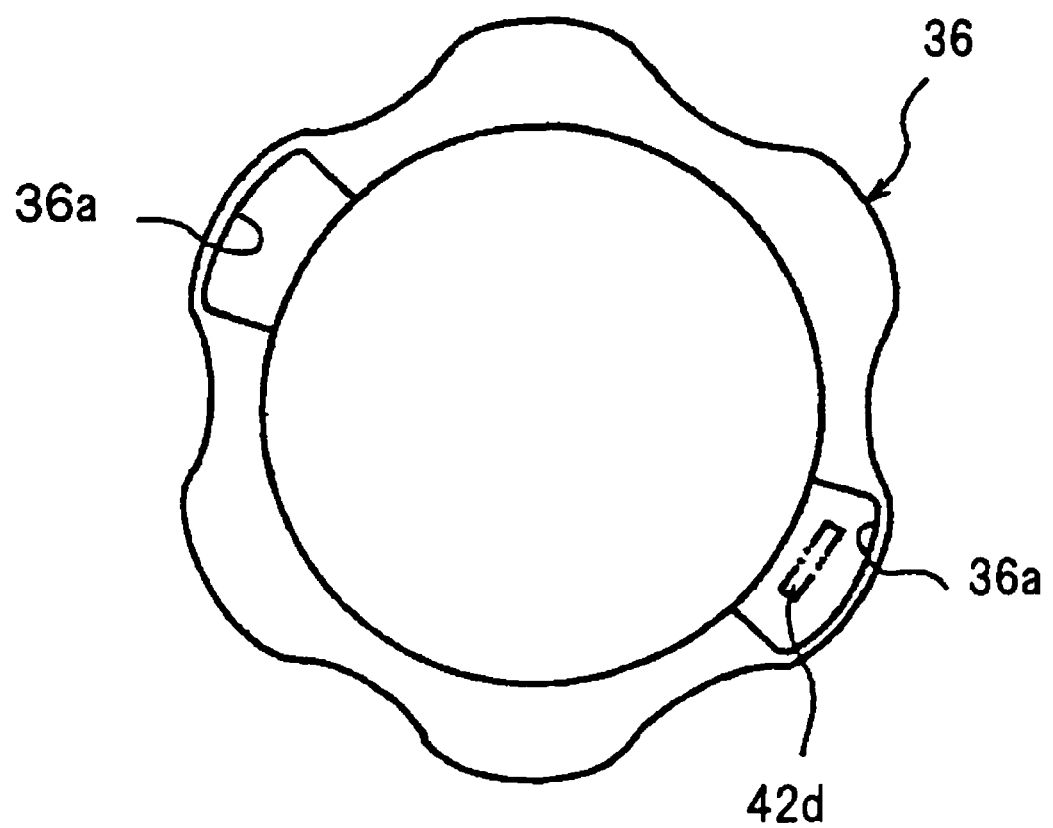
FIG. 5 is a diagrammatic view showing a backside of the cap member shown in FIG. 4.

On the other hand, in the cap member 36 which is configured to be screwed on the inlet port 34 to seal the inlet port 34, as shown in FIG. 4 and FIG. 5, recess portions 36a and 36b, arranged as engagement portions, with which the locking member 42d of the lock 42 can be engaged, are formed respectively on positions symmetric to the cap center on a backside of an outer peripheral portion of the cap member 36. The forming positions of the recess portions 36a and 36b are such that, in a state where, when the cap member 36 is screwed on the inlet port 34 to seal the inlet port 34, one of the recess portions 36a and 36b is positioned above the locking member 42d of the lock 42. Incidentally, on a center portion of a front surface of the cap member 36, as shown in FIG. 4, a mark is made so that the position of the inlet port 34 of the reducing agent container 24 can be recognized at a glance when the inlet port 34 is sealed by the cap member 36.

Figure 6:
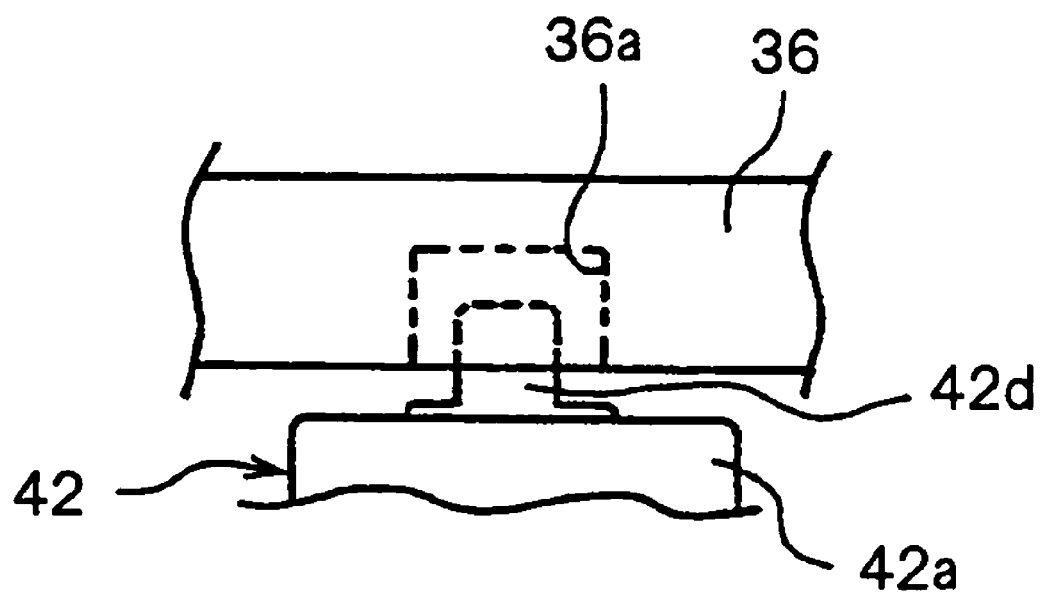
FIG. 6 is an explanatory diagrammatic view of an operation according to the first embodiment.

In the reducing agent container 24 according to the first embodiment as described above, in the state where the cap member 36 is screwed to be fastened and secured on the inlet port 34 to thereby seal the inlet port 34, either the recess portion 36a or the recess portion 36b is positioned above the locking member 42d of the lock 42. In this state, by inserting the key into the key slot 42c of the lock 42 to turn the inter cylinder 42b for locking, the locking member 42d is protruded from the lock body 42a, and the locking member 42d runs in the recess portion 36a as shown in FIG. 6. As a result, even if trying to rotate the cap member 36, the locking member 42d abuts on a side wall face of the recess portion 36a, so that the rotation of the cap member 36 can be blocked and prevented.

Consequently, unless the locking of the lock 42 is released by the key, the cap member 36 cannot be easily removed from the inlet port 34. Therefore, it is possible to prevent mischief, such as the dropping of foreign substances, such as the dust, dottle or the like, into the reducing agent container 24. Further, since the lock 42 is arranged on the outer face of the inlet port 34, the reducing agent in the reducing agent container 24 does not intrude into the lock 42. Accordingly, there is no concern about the locking/unlocking operations of the lock 42 becoming unable due to solute deposition of the reducing agent. Furthermore, according to the present embodiment, since the lock 42 is arranged on the lateral side of the inlet port 34 and not on the position directly therebelow, even in the case where the liquid reducing agent is spilled out through the inlet port 34, the liquid reducing agent does not directly spilled on the lock 42. Therefore, it is possible to prevent the liquid reducing agent from intruding into the lock 42. Still further, since the lock 42 is arranged on the outer face of the inlet port 34 and on the right hand of the cap member 36, the locking/unlocking operations of the lock 42 by an operator by the right hand can be easily performed. Even still further, since the recess portions 36a and 36b are formed on the positions symmetric to the cap center, when the cap member 36 is fastened and secured, either the recess portion 36a or the recess portion 36b may be positioned against the locking member 42d, and accordingly, the degree of freedom of attaching the cap member 36 on the inlet port 34 is increased. Moreover, since the engagement portion (the recess portion 36a) of the locking member 42d is formed on the backside of the outer peripheral portion of the cap member 36, an external appearance of the cap member 36 can be made same as that of a cap member which is not provided with a cap lock mechanism, as shown in FIG. 4.

Incidentally, the structure of the cap lock mechanism in the reducing agent container 24 according to the present invention is not limited to that in the first embodiment.

Figure 7:
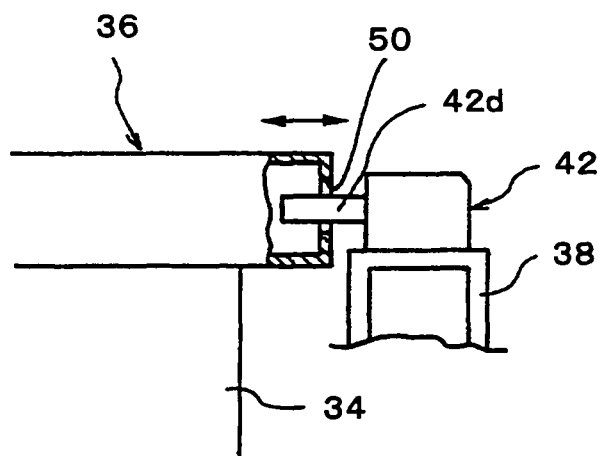
FIG. 7 is a schematic configuration diagram showing a cap member locked state according to a second embodiment of the present invention.

For example, according to the second embodiment as shown in FIG. 7, an engagement hole 50 arranged as the engagement portion may be configured to be bored on a side face of the outer peripheral portion of the cap member 36, and on the other hand, the lock 42 may be secured on the base portion 38 in a manner being arranged outside the outer peripheral side face portion of the cap member 36 so that the locking member 42 travels in a diameter direction of the cap member 36 (an arrow direction indicated in the figure).

In such a second embodiment, when the cap member 36 is screwed to be fastened and secured on the inlet port 34 to seal the inlet port 34, and when the lock 42 is locked similarly to the first embodiment, the locking member 42d protrudes in the diameter direction of the cap member 36 to run in the engagement hole 50 as shown in the figure, so that the rotation of the cap member 36 can be blocked and prevented.

Figure 8:
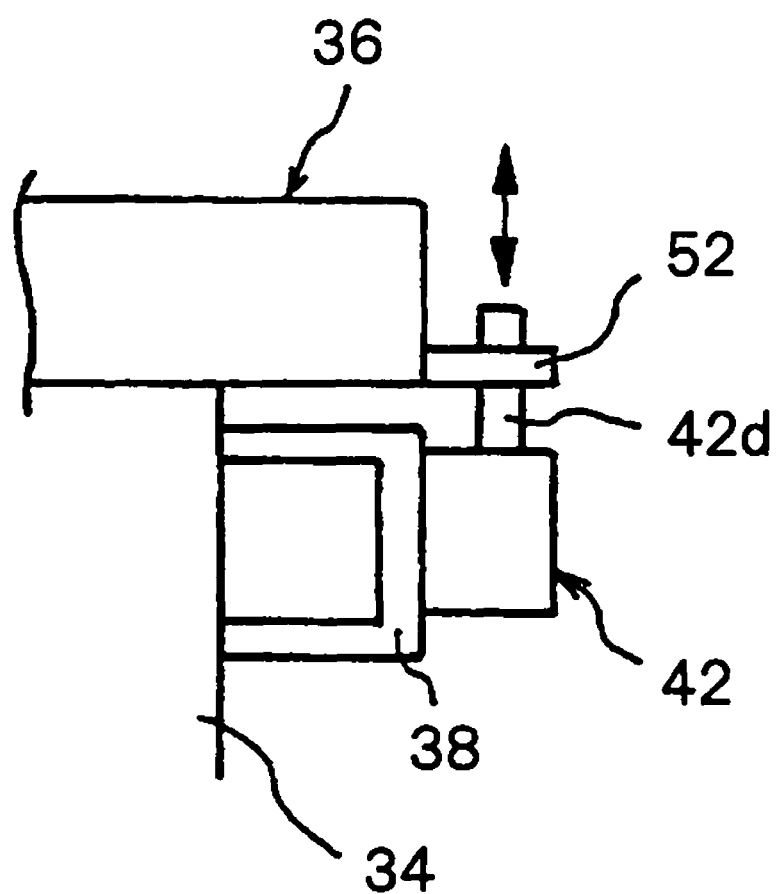
FIG. 8 is a schematic configuration diagram showing a cap member locked state according to a third embodiment of the present invention.
Figure 9:
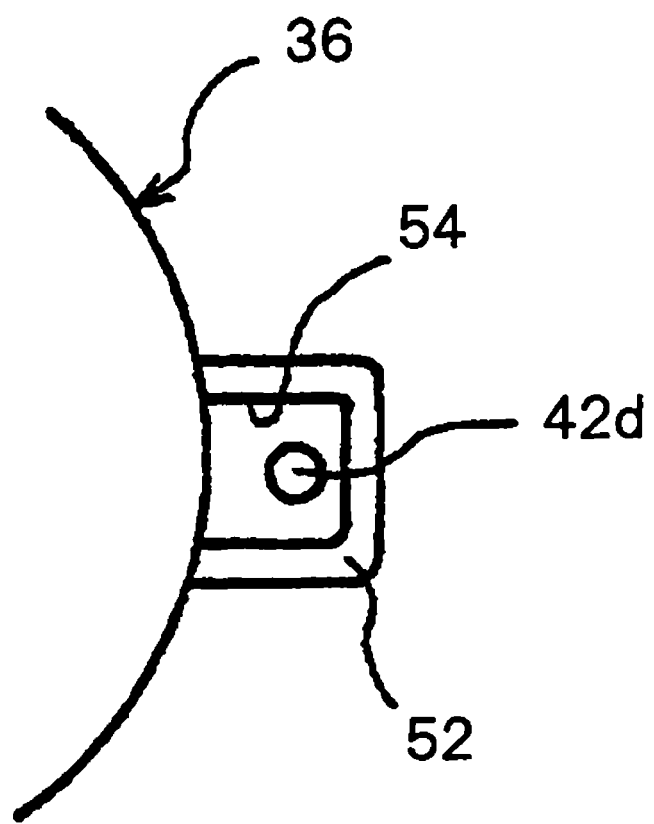
FIG. 9 is a schematic top view of FIG. 8.

Further, according to a third embodiment as shown in FIG. 8 and FIG. 9, an engagement hole 54 arranged as the engagement portion may be formed by attaching a U-shaped member 52 on the outer peripheral portion of the cap member 36, and the lock 42 may be arranged to be secured on the base portion 38 so that the locking member 42d travels in an axial direction of the cap member 36 (an arrow direction indicated in FIG. 8).

In such a third embodiment, when the cap member 36 is screwed to be fastened and secured on the inlet port 34 to seal the inlet port 34, and when the lock 42 is locked, the locking member 42d protrudes in the axial direction of the cap member 36 to run in the engagement hole 54 as shown in FIG. 8, so that the rotation of the cap member 36 can be blocked and prevented.

Figure 10:
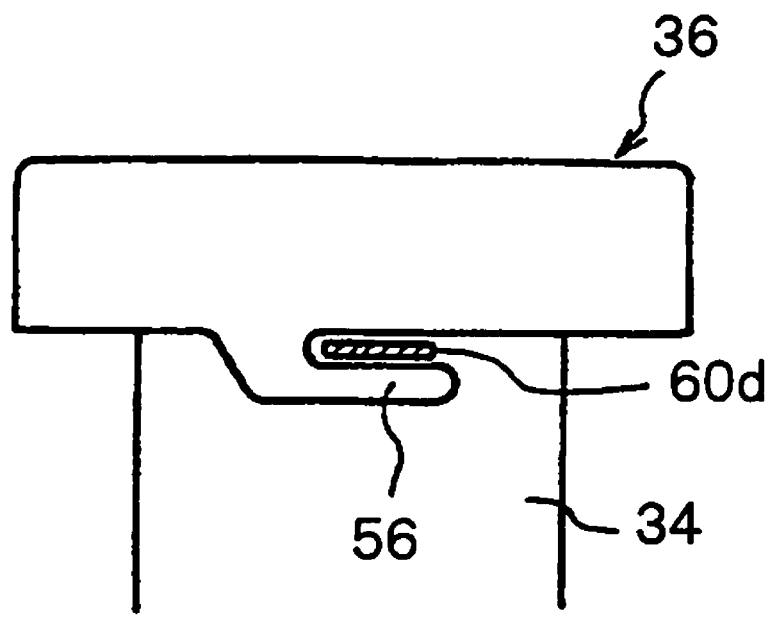
FIG. 10 is a schematic configuration diagram showing a cap member locked state according to a fourth embodiment of the present invention.
Figure 11:
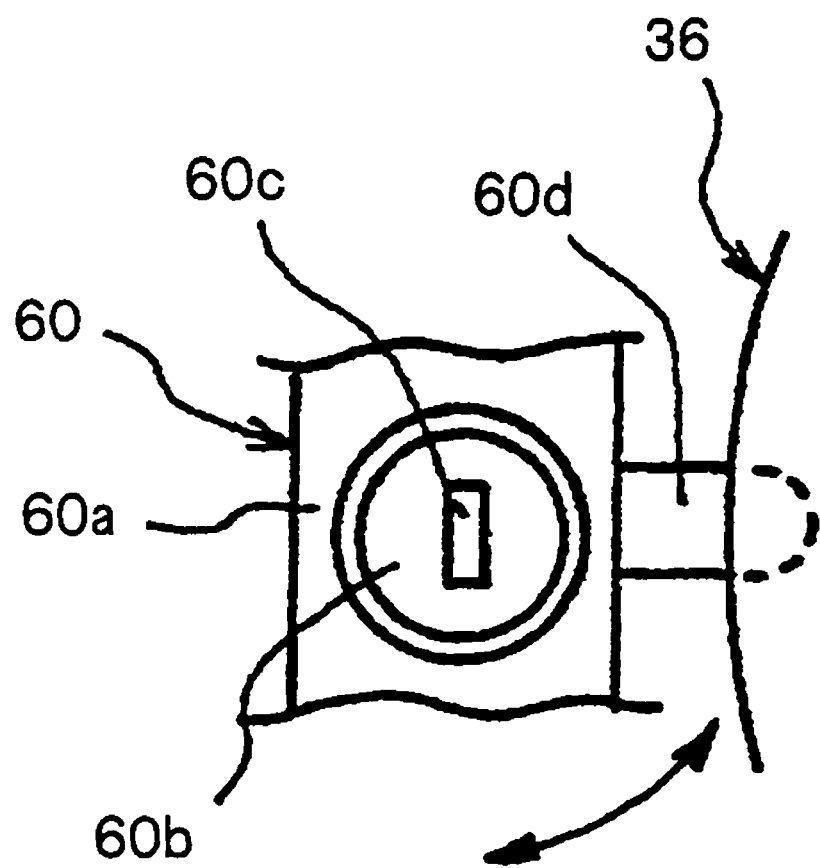
FIG. 11 is a schematic top view of FIG. 10.

Furthermore, according to a fourth embodiment as shown in FIG. 10 and FIG. 11, a hook portion 56 arranged as the engagement portion is formed on the outer peripheral portion of the cap member 36 as shown in FIG. 10. Further, as shown in FIG. 11, a lock 60 according to the present embodiment may be configured such that when an internal cylinder 60b disposed with a key slot 60c is subjected to the locking/unlocking operations, a locking member 60d is turned in an arrow direction of FIG. 11 to move in or out of a lock body 60a, and this lock 60 is arranged outside the outer peripheral portion of the cap member 36.

In such a fourth embodiment, in the state where the cap member 36 seals the inlet port 34 by being screwed to be fastened and secured on the inlet port 34, when the lock 60 is locked, the locking member 60d is turned to be engaged with the hook portion 56 as shown in FIG. 10, so that the rotation for removing the cap member 36 can be blocked and prevented.

Figure 12:
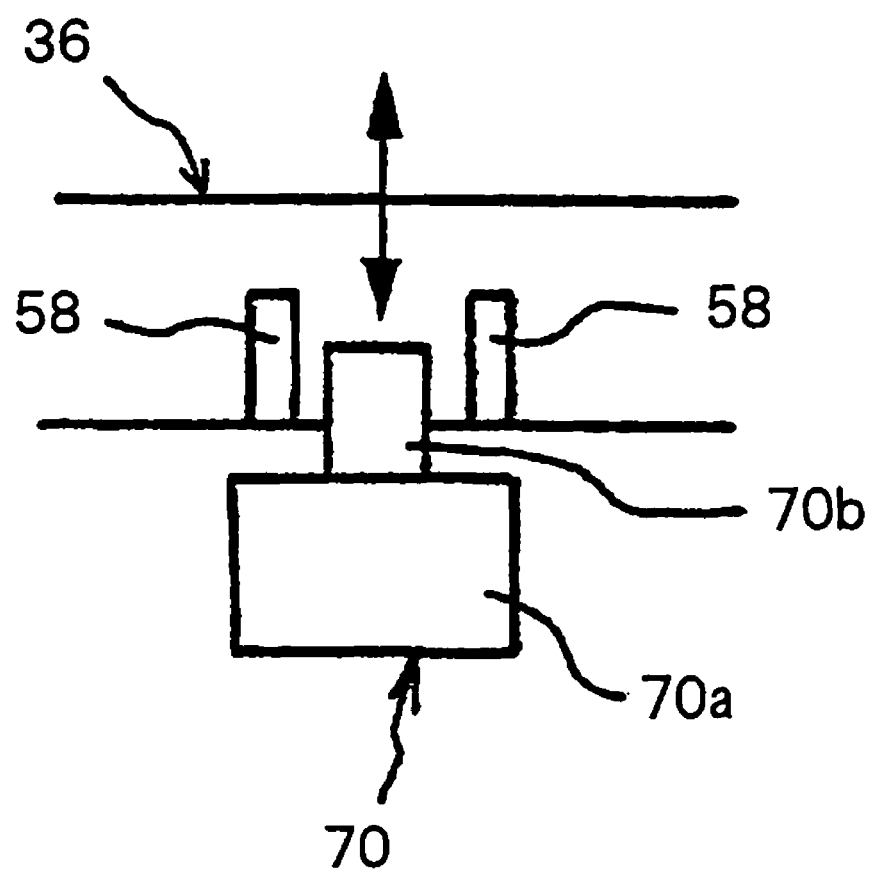
FIG. 12 is a schematic configuration diagram showing a cap member locked state according to a fifth embodiment of the present invention.
Figure 13:
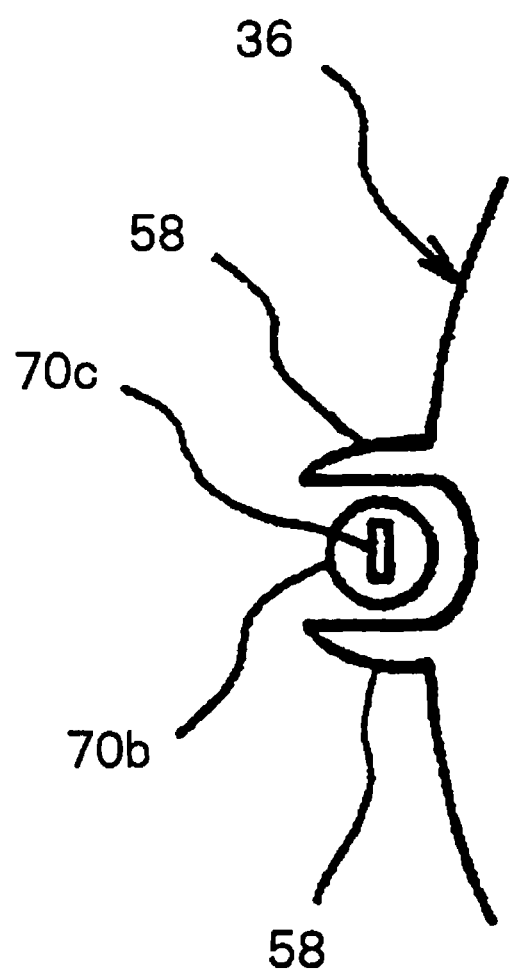
FIG. 13 is a schematic top view of FIG. 12.

Further, according to a fifth embodiment shown in FIG. 12 and FIG. 13, a pair of protruding portions 58, 58 each of which outwardly protrudes are formed as the engagement portions on the outer peripheral side face portion of the cap member 36 as shown in FIG. 13. Furthermore, as shown in FIG. 12, a lock 70 according to the present embodiment may be configured such that an internal cylinder 70b disposed with a key slot 70c moves in or out of a lock body 70a by the locking/unlocking operations to also serve as the locking member, and the lock 70 is arranged so that the internal cylinder 70b travels in the axial direction (an arrow direction indicated in FIG. 12) of the cap member 36.

In such a fifth embodiment, when the cap member 36 seals the inlet port 34 by being screwed to be fastened and secured on the inlet port 34, when the lock 70 is locked, the internal cylinder 70b protrudes upwardly to run into a space between the pair of protruding portions 58, 58, so that the rotation of the cap member 36 can be blocked and prevented.

The present invention is capable of improving the reliability of the exhaust emission purifying system, by preventing mischief to the reducing agent container which results in the failure of the exhaust emission purifying system using the liquid reducing agent, and therefore, has the large industrial applicability.

It should be appreciated that the entire contents of Japanese Patent Application No. 2004-313384, filed on Oct. 28, 2004, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

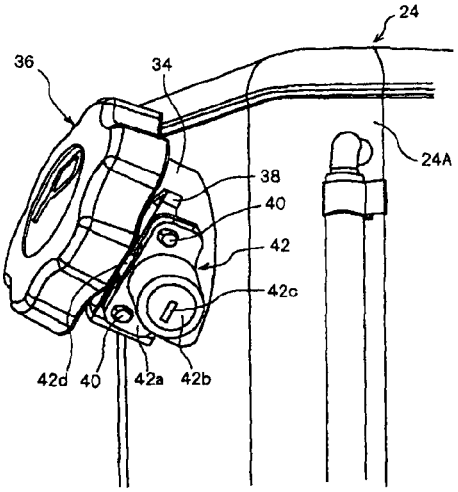

We claim:

1. A urea aqueous solution container used in an exhaust emission purifying apparatus for reductively purifying nitrogen oxides in engine exhaust gas using a urea aqueous solution, comprising:

a container body;

an inlet port through which a urea aqueous solution is poured into said container body, said inlet port formed to protrude obliquely upward from a side face of said container body;

a base portion secured on an outer face of said inlet port and obliquely below said inlet port, wherein the base portion protrudes from the outer face of the inlet port;

a lock including a lock body detachably secured on the base portion, an internal cylinder incorporated in the lock body so as to be turned, and a locking member which appears from the lock body by turning the internal cylinder;

a cap member configured to be screwed on said inlet port to seal said inlet port; and a plurality of engagement portions with which said locking member of said lock can be engaged, wherein said plurality of engagement portions are formed on an outer peripheral portion of said cap member and each engagement portion is disposed at a position symmetric with another engagement portion on an opposite side of a center of said cap member, wherein said locking member is engageable with said plurality of engagement portions, through locking operation of said lock, to thereby prevent rotation of said cap member.

2. The urea aqueous solution container according to claim 1, wherein said lock is mounted on a right hand of said cap member.

3. The urea aqueous solution container according to claim 1, wherein a recess portion is formed as said engagement portion, on a backside of an outer peripheral portion of said cap member, and wherein said locking member moves in or out of said recess portion in response to a motion of said locking member traveling in an axial direction of said cap member.

* * * * *

UNITED STATES PATENT AND TRADEMARK OFFICE
CERTIFICATE OF CORRECTION

| | |
|---|---|
| PATENT NO. | : 8,453,863 B2 |
| APPLICATION NO. | : 11/790740 |
| DATED | : June 4, 2013 |
| INVENTOR(S) | : Yasushi Osaku et al. |

It is certified that error appears in the above-identified patent and that said Letters Patent is hereby corrected as shown below:

Delete the title page and substitute therefore with the attached title page showing the corrected number of claims in patent.

IN THE CLAIMS:

Column 8, line 36 insert claims 4-8

-- 4. The urea aqueous solution container according to claim 1, wherein an engagement hole is bored as said engagement portion, and wherein said locking member moves in or out of said engagement hole in response to a motion of said locking member traveling in a cap diameter direction.

5. The urea aqueous solution container according to claim 1, wherein an engagement hole is disposed as said engagement portion on an outer peripheral portion of said cap member, and wherein said locking member moves in or out of said engagement hole in response to a motion of said locking member traveling in an axial direction of said cap member.

6. The urea aqueous solution container according to claim 1, wherein a hook portion is formed as said engagement portion on an outer peripheral portion of said cap member, and wherein said locking member moves in or out of said hook portion in response to a rotational motion of said locking member.

7. The urea aqueous solution container according to claim 1, wherein a pair of protruding portions each of which protrudes outwardly from said side face is formed as said engagement portion on a side face of an outer peripheral portion of said cap member, and wherein said locking member moves in or out of a space between said pair of protruding portions in response to a motion of said locking member traveling in an axial direction of said cap member.

8. The urea aqueous solution container according to claim 1, wherein said lock is located on a right hand of said cap member and on a lower side of a center of said inlet port. --

Signed and Sealed this
Fifteenth Day of April, 2014

Michelle K. Lee
*Deputy Director of the United States Patent and Trademark Office*

(12) United States Patent
Osaku et al.

(10) Patent No.: US 8,453,863 B2
(45) Date of Patent: Jun. 4, 2013

(54) REDUCING AGENT CONTAINER STRUCTURE

(75) Inventors: Yasushi Osaku, Ageo (JP); Kiyoshi Fukuda, Ageo (JP); Toshio Kondou, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 517 days.

(21) Appl. No.: 11/790,740

(22) Filed: Apr. 27, 2007

(65) Prior Publication Data

US 2008/0138258 A1 Jun. 12, 2008

Related U.S. Application Data

(63) Continuation of application No. PCT/JP2005/017293, filed on Sep. 20, 2005.

(30) Foreign Application Priority Data

Oct. 28, 2004 (JP) ................................ 2004-313384

(51) Int. Cl.
*B65D 65/14* (2006.01)

(52) U.S. Cl.
USPC .......................... 220/210; 220/288; 215/207

(58) Field of Classification Search
USPC .......... 220/210, DIG. 20, DIG. 33, DIG. 32, 220/288; 215/207
See application file for complete search history.

(56) References Cited

U.S. PATENT DOCUMENTS

| | | | | |
|---|---|---|---|---|
| 1,689,979 A | * | 10/1928 | Tate et al. | 70/166 |
| 1,702,532 A | * | 2/1929 | Boomer et al. | 220/210 |
| 1,747,200 A | * | 2/1930 | White | 70/164 |
| 1,839,423 A | | 1/1932 | Stone | |
| 1,902,456 A | * | 3/1933 | Matthews | 220/86.2 |
| 1,936,207 A | * | 11/1933 | Penn | 70/173 |
| 1,989,300 A | * | 1/1935 | Webb | 220/86.2 |

(Continued)

FOREIGN PATENT DOCUMENTS

| | | |
|---|---|---|
| DE | 10024817 A1 | 11/2001 |
| DE | 20312178 U1 | 10/2003 |

(Continued)

OTHER PUBLICATIONS

Notice of Reasons of Rejection of the present invention of Japanese Patent Application No. 2004-303462.

*Primary Examiner* — Anthony Stashick
*Assistant Examiner* — Christopher McKinley
(74) *Attorney, Agent, or Firm* — McDermott Will & Emery LLP

(57) ABSTRACT

A liquid reducing agent container structure adapted for an exhaust emission purifying system that is capable of reductively purifying NO$_x$ in the exhaust gas using a liquid reducing agent, and provided with a configuration such that a lock (42, 60, 70) is detachably disposed on the outer face of an inlet port (34) disposed on a container body (24A) of a reducing agent container (24), and an engagement portion (36a, 50, 54, 56, 58) with which a locking member (42d, 60d, 70b) of the lock (42, 60, 70) can be engaged is disposed on the side of a cap member (36) which is configured to be screwed on the inlet port (34) to seal the inlet port (34), thereby engaging the locking member (42d, 60d, 70b) with the engagement portion (36a, 50, 54, 56, 58) with a locking operation by the lock (42, 60, 70) to block and prevent a rotation of the cap member (36).

8 Claims, 13 Drawing Sheets